US012488623B2

(12) United States Patent
Wang et al.

(10) Patent No.: US 12,488,623 B2
(45) Date of Patent: Dec. 2, 2025

(54) SYSTEM AND A METHOD FOR ANALYZING A VIDEO

(71) Applicant: Blue Planet Training, Inc., Montclair, NJ (US)

(72) Inventors: Xingbo Wang, Wuhan (CN); Yong Wang, Singapore (SG); Aoyu Wu, Kowloon (HK); Huamin Qu, Kowloon (HK)

(*) Notice: Subject to any disclaimer, the term of this patent is extended or adjusted under 35 U.S.C. 154(b) by 762 days.

(21) Appl. No.: 17/829,451

(22) Filed: Jun. 1, 2022

(65) Prior Publication Data
US 2023/0394884 A1    Dec. 7, 2023

(51) Int. Cl.
*G06V 20/40*  (2022.01)
*G06F 40/30*  (2020.01)
(Continued)

(52) U.S. Cl.
CPC .............. *G06V 40/28* (2022.01); *G06F 40/30* (2020.01); *G06T 7/20* (2013.01); *G06V 20/41* (2022.01); *G06V 20/48* (2022.01); *G06V 20/49* (2022.01); *G10L 15/26* (2013.01); *G10L 25/57* (2013.01); *G06T 2200/24* (2013.01);
(Continued)

(58) Field of Classification Search
CPC .............. G06F 40/30; G06T 2200/24; G06T 2207/10016; G06T 2207/30196; G06T 2207/30241; G06T 7/20; G06V 20/41; G06V 20/48; G06V 20/49; G06V 40/28; G10L 15/26; G10L 25/57
See application file for complete search history.

(56) References Cited

U.S. PATENT DOCUMENTS

| 2014/0164506 A1* | 6/2014 | Tesch | H04L 51/52 709/204 |
| 2021/0073526 A1* | 3/2021 | Zeng | G06V 20/41 |
| 2021/0076105 A1* | 3/2021 | Parmar | H04N 21/234336 |

OTHER PUBLICATIONS

Zeng, Haipeng, et al. "Gesturelens: Visual analysis of gestures in presentation videos." IEEE Transactions on Visualization and Computer Graphics 29.8 (2022): 3685-3697. (Year: 2022).*
(Continued)

*Primary Examiner* — Michael J Vanchy, Jr.
(74) *Attorney, Agent, or Firm* — NCC-IP; Nevin Stuart Carmichael

(57) ABSTRACT

The invention relates to a computer implemented method and system for analyzing a video. The method comprises the steps of receiving, via a receiving module, a video data comprising a series of images showing a subject; extracting, via an extracting module, a transcript derived from an audio data associated with the video data; aligning, via an aligning module, the series of images of the video data with the transcript derived from the audio data associated with the video data based on timestamps derived from the video data; analyzing, via an analyzing module, gestures of the subject from the series of images, comprising the steps of: identifying a plurality of reference points from each of the series of images showing the subject; segmenting the series of images in accordance with one or more selected texts comprising the transcript; identifying a defined gesture type for each of the segmented images based on the identified plurality of reference points; and processing, via a processing module, the defined gesture types in correlation with respective one or more selected texts comprising the transcript.

18 Claims, 10 Drawing Sheets

(51) Int. Cl.
*G06T 7/20* (2017.01)
*G06V 40/20* (2022.01)
*G10L 15/26* (2006.01)
*G10L 25/57* (2013.01)

(52) U.S. Cl.
CPC ............... *G06T 2207/10016* (2013.01); *G06T 2207/30196* (2013.01); *G06T 2207/30241* (2013.01)

(56) References Cited

OTHER PUBLICATIONS

Saund, Carolyn, and Stacy Marsella. "The importance of qualitative elements in subjective evaluation of semantic gestures." 2021 16th IEEE International Conference on Automatic Face and Gesture Recognition (FG 2021). IEEE, 2021. (Year: 2021).*
Gesturelens, IEEE Tranactions, Zeng, etal. Apr. 2022.

* cited by examiner

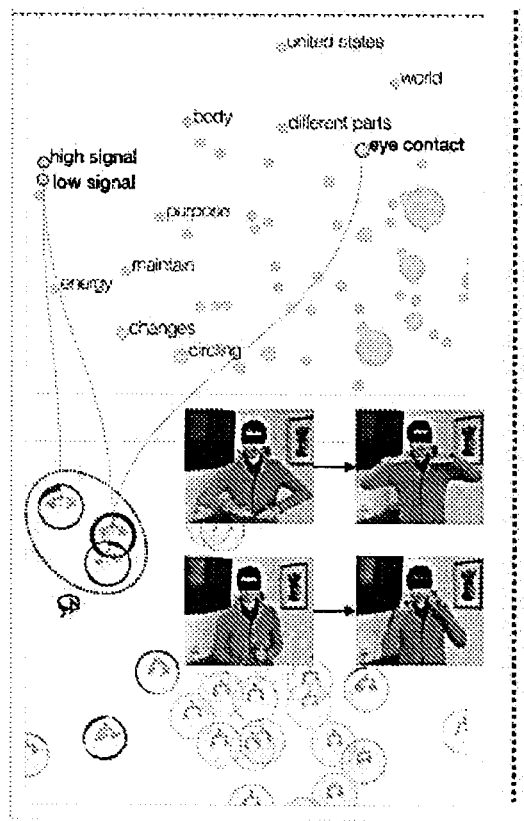
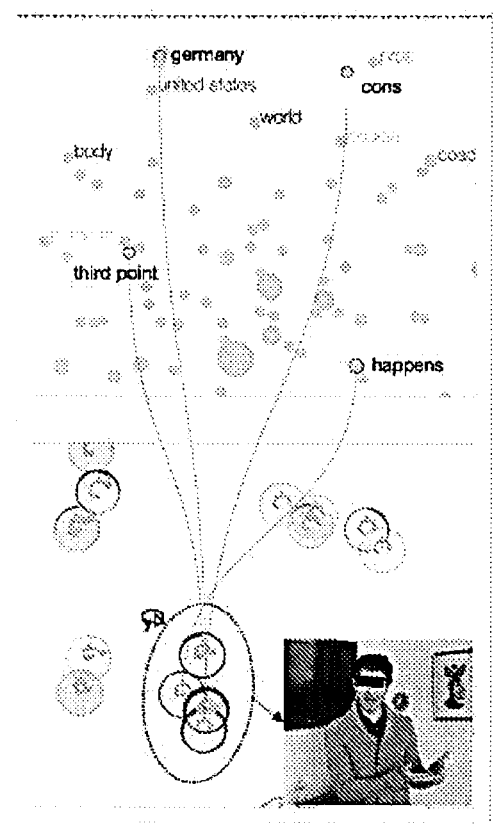
FIG. 9A                    FIG. 9B

SYSTEM AND A METHOD FOR ANALYZING A VIDEO

FIELD OF THE INVENTION

The invention relates to a system and a method for analyzing a video, and more particularly, to a system and a method for analyzing gestures of a speaker from a video.

BACKGROUND OF THE INVENTION

It is appreciated that gestures play an important role in communications and presentations. Speakers generally use gestures spontaneously when giving a speech or giving explanations. However, it can be challenging to use appropriate gestures in public presentations and in daily communications, and particularly, to demonstrate a coherence in gesture and verbal content when delivering messages. For example, hand gestures should convey the same meaning as the verbal content while avoiding distracting audiences. Appropriate gestures therefore have a significant influence on message delivery and audience engagement.

Existing guidelines for gestures are mostly theoretically derived, leading to misalignment with practical and theoretical sources. It is hard for presentation coaches to train speakers on gesture usage. It is even harder for speakers to get aware of the performance of their own gestures. Coaches may analyze good presentation videos or videos recording speakers' practices, which can provide some examples and evidences for improvement.

However, manually checking and exploring gesture usage in presentation videos is often tedious and time-consuming. Some existing tools have been proposed to facilitate analyzing gestures in collected videos. For example, ELAN (P. Wittenburg, H. Brugman, A. Russel, A. Klassmann, and H. Sloetjes, "*Elan: a professional framework for multimodality research,*" in *Proceedings of the International Conference on Language Resources and Evaluation,* 2006, pp. 1556-1559) helps users to annotate gestures in videos. But it is time-consuming for the users to watch videos one by one, let alone to explore and analyze gestures in presentation videos. Other studies (J. Wan, Y. Zhao, S. Zhou, I. Guyon, S. Escalera, and S. Z. Li, "*Chalearn looking at people rgb-d isolated and continuous datasets for gesture recognition,*" in *Proceedings of the IEEE Conference on Computer Vision and Pattern Recognition Workshops,* 2016, pp. 56-64. J. Materzynska, G. Berger, I. Bax, and R. Memisevic, "*The jester dataset. A large-scale video dataset of human gestures,*" in *Proceedings of the IEEE International Conference on Computer Vision Workshops,* 2019, pp. 0-0. R. Poppe, "*A survey on vision-based human action recognition,*" *Image and Vision Computing,* vol. 28, no. 6, pp. 976-990, 2010. D. Wu, L. Pigou, P.-J. Kindermans, N. D.-H. Le, L. Shao, J. Dambre, and J.-M. Odobez, "*Deep dynamic neural networks for multimodal gesture segmentation and recognition,*" *IEEE Transactions on Pattern Analysis and Machine Intelligence,* vol. 38, no. 8, pp. 1583-1597, 2016) have focused on automatically recognizing gestures. However, they focus only on limited types of gestures without regard to verbal content.

There lacks an efficient method to help users to conduct gesture exploration, which is challenging due to the dynamic nature of gestures and their complex correlation to speech content. A system for use in analyzing videos which support exploring of gestures is therefore desired.

OBJECTS OF THE INVENTION

An object of the invention is to mitigate or obviate to some degree one or more problems associated with known systems and methods for analyzing videos.

Another object of the invention is to provide an improved system and method for analyzing gestures of a speaker from a video.

Another object of the invention is to provide an improved system and method for exploring correlation between gestures of a speaker and content of the speech from a video.

Yet another objection of the invention is to provide an improved system and method for visualizing a video analytic.

The above object is met by the combination of features of the main claims; the sub-claims disclose further advantageous embodiments of the invention.

One skilled in the art will derive from the following description other objects of the invention. Therefore, the foregoing statements of object are not exhaustive and serve merely to illustrate some of the many objects of the present invention.

SUMMARY OF THE INVENTION

The invention generally relates to a visual analytic system and method which facilitates both gesture-based and content-based exploration of gesture usage in presentation videos. The system enables users to obtain an overview of the spatial and temporal distributions of gestures in association with content of the video. The system may consist of four coordinated views to support the gesture-based and content-based exploration schemes on video analysis. Specifically, the exploration view enables users to study the spatial and temporal distributions of gestures in the video. The dynamic hand movements of the speaker are firstly aggregated through a heatmap in the gesture space for uncovering spatial patterns, and then decomposed into two mutually perpendicular timelines for revealing temporal patterns. The relation view allows users to explicitly explore the correlation between speech content and gestures by enabling linked analysis and intuitive glyph designs. The video view and dynamic view further show the context and the overall dynamic movement of the selected gestures, respectively. The effectiveness and usefulness of the present invention in facilitating gesture exploration and analysis of presentation videos are further demonstrated by usage scenarios with professional presentation coaches.

In a first main aspect, the invention provides a computer implemented method for analyzing a video. The method comprises the steps of: receiving, via a receiving module, a video data comprising a series of images showing a subject; extracting, via an extracting module, a transcript derived from an audio data associated with the video data; aligning, via an aligning module, the series of images of the video data with the transcript derive from the audio data associated with the video data based on timestamps derived from the video data; analyzing, via an analyzing module, gestures of the subject from the series of images, comprising the steps of: identifying a plurality of reference points from each of the series of images showing the subject; segmenting the series of images in accordance with one or more selected texts comprising the transcript; identifying a defined gesture type for each of the segmented images based on the identified plurality of reference points; and processing, via a processing module, the defined gesture types in correlation with respective one or more selected texts comprising the transcript.

In a second main aspect, the invention provides a system for analyzing a video implementing the steps of the first main aspect. The system comprises a receiving module for receiving a video data comprising a series of images showing a subject; an extracting module for extracting a transcript derived from an audio data associated with the video data; an aligning module for aligning the series of images of the video data with the transcript derived from the audio data associated with the video data based on timestamps derived from the video data; an analyzing module for analyzing gestures of the subject from the series of images, comprising the steps of: identifying a plurality of reference points from each of the series of images showing the subject; segmenting the series of images in accordance with one or more selected texts comprising the transcript; identifying a defined gesture type for each of the segmented images based on the identified plurality of reference points; and a processing module for processing the defined gesture types in correlation with respective one or more selected texts comprising the transcript.

In a third main aspect, the invention provides a non-transitory computer readable medium storing machine-readable instructions executable by a processor to configure a system for analyzing a video by implementing the steps of receiving, via a receiving module, a video data comprising a series of images showing a subject; extracting, via an extracting module, a transcript derived from an audio data associated with the video data; aligning, via an aligning module, the series of images of the video data with the transcript derived from the audio data associated with the video data based on timestamps derived from the video data; analyzing, via an analyzing module, gestures of the subject from the series of images, comprising the steps of: identifying a plurality of reference points from each of the series of images showing the subject; segmenting the series of images in accordance with one or more selected texts comprising the transcript; identifying a defined gesture type for each of the segmented images based on the identified plurality of reference points; and processing, via a processing module, the defined gesture types in correlation with respective one or more selected texts comprising the transcript.

BRIEF DESCRIPTION OF THE DRAWINGS

The foregoing and further features of the present invention will be apparent from the following description of preferred embodiments which are provided by way of example only in connection with the accompanying figures, of which:

FIGS. 9A and 9B show another exemplified usage scenarios based on the system of the present invention.

DESCRIPTION OF PREFERRED EMBODIMENTS

Figure 1:
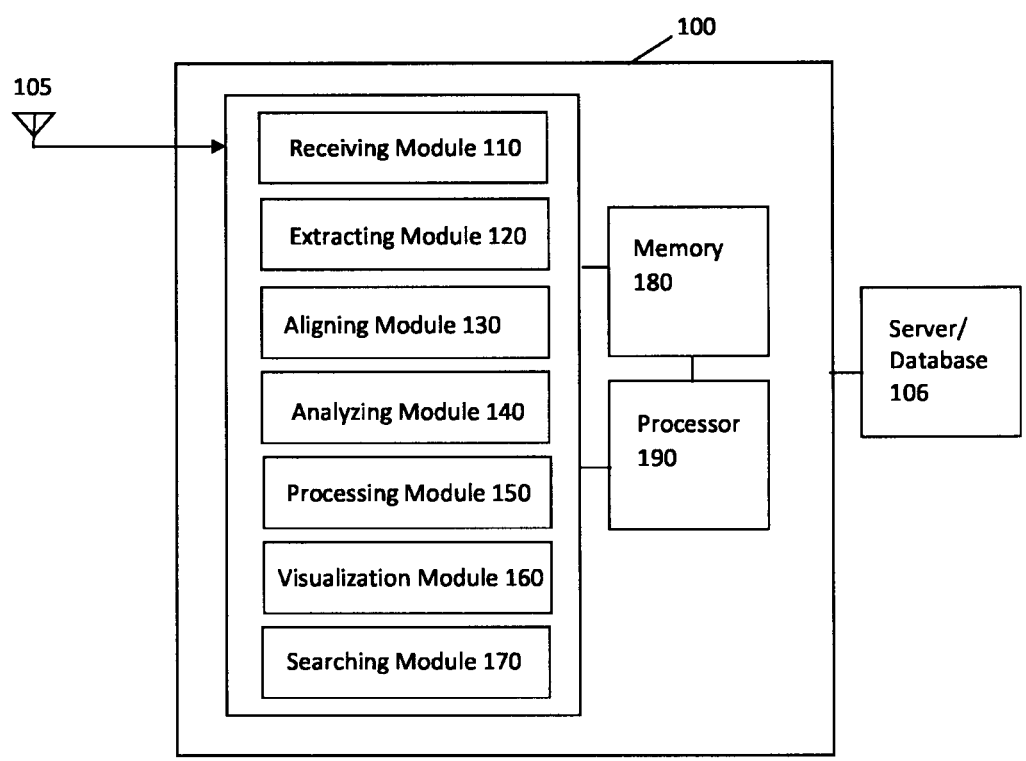
FIG. 1 is a block schematic diagram of a system for analyzing a video in accordance with the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the figures, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Gestures generally refer to the hand and/or body movements of a subject person that facilitate message delivery. It is known that analyzing gestures from presentation videos is a nontrivial task due to three major reasons: (1) Dynamic process—Gestures in presentation videos can be regarded as high dimensional time-series data, since it includes the movement of multiple joints. The stochastic and dynamic nature process of human motion brings significant challenges in measuring and understanding gestures in presentation videos. (2) Complex gesture categories—Different people have different gesture styles in presentation scenarios. Most analytical systems in the prior art mainly focus on a few, limited categories of gestures, which is not sufficient in fully representing various gestures used in presentation scenarios. It is difficult to summarize and digest different gestures without clearly defined categories. (3) Hidden relationships—People usually produce spoken utterances accompanying a series of gestures spontaneously. The meaning of gestures is related to various kinds of speech content. Moreover, gestures may have no apparent meaning. Gestures are often related to speech content and thus, without speech content, it will be difficult to interpret gestures used in different presentations.

The present invention provides an interactive visualization system to support the exploration of gestures and the relationship between gestures and speech in presentation videos. The visualization system may comprise four coordinated views, namely, the exploration view, the relation view, the video view and the dynamic view to support two basic exploration schemes, i.e. a gesture-based exploration and a content-based exploration, on gesture analysis in presentation videos. In one embodiment, to illustrate dynamic hand movements, a heatmap in the gesture space and two mutually perpendicular timelines in the exploration view are designed to visualize the spatial and temporal distributions of gestures. To better analyze different gestures, similar gestures are identified from the video and users are allowed to leverage their prior knowledge for gesture analysis. The relation view further shows the similarities between different gestures. To reveal the hidden relationships between gestures and speech content, human stickfigure glyphs are shown on the top of each word of the transcript in the exploration view. Further, users are allowed to explore the correlation between gestures and speech content in the relation view with the linked graph design. In addition, the video view and dynamic view provide users with further details on the video analysis. The present invention therefore provides a visual analytics system to facilitate an effective exploration of gesture usage during a speech, as well as the correlation of gestures with the speech content.

FIG. 1 shows an exemplary embodiment of a system 100 in accordance with concepts of the present invention. In the illustrated embodiment, the system 100 comprises a computer processing device such as a communication equipment such as a smart phone, a tablet computer, a laptop computer, a personal computer (PC), or the like, although any suitable data or signal processing device or system may be utilized. The system 100 may be connected via a communication network to a server and/or to a database 106 or the like, although this is not essential to the implementation of the invention. The communication network may comprise a wireless network, e.g. a wireless cellular network, a wired network, the internet or any combination of the foregoing.

The system 100 may comprise a plurality of functional blocks for performing various functions thereof. For example, the system 100 may include a receiving module 110 configured to receive data such as a video data comprising a series of images or frames showing a subject person. The receiving module 110 may comprise various data sink, control element(s), user interface(s), etc. Although the receiving module 110 is described as a receiver for signal or data, it will be appreciated that this functional block may be implemented as a transceiver providing both transmitting and receiving of signal or data such as via antenna 105 and/or another type of system input, although it will be understood that video data in the form of video speech clips may be received or inputted to the receiving module 110 of the system 100 by suitable means familiar to one skilled in the art. Furthermore, it will be appreciated that it is not essential to the implementation of the aspects of the invention that the system 100 is able to receive and/or transmit signals. The system 100 may comprise a stand-alone system or device. The system 100 may further comprise other functional blocks including, but are not limited to, one or more of an extracting module 120 for extracting a transcript derived from an audio data associated with the video data; an aligning module 130 for aligning the series of images of the video data with the transcript derive from the audio data associated with the video data based on timestamps derived from the video data; an analyzing module 140 for analyzing gestures of the subject from the series of images. In one embodiment, the analyzing module 140 may be configured to implement the steps of identifying a plurality of reference points from each of the series of images showing the subject, segmenting the series of images in accordance with one or more selected texts comprising the transcript; and identifying a defined gesture type for each of the segmented images based on the identified plurality of reference points. The system 100 may further comprise a processing module 150 for processing the defined gesture types in correlation with respective one or more selected texts comprising the transcript. Preferably, the system 100 may further comprise a visualization module 160 for presenting the correlation between the defined gesture types and the one or more selected texts comprising the transcript.

In one further embodiment, the system 100 may further comprise a searching module 170 for searching, by inputting either a defined gesture type or a selected text; and outputting a corresponding one of a selected text or a defined gesture type, respectively.

Although the receiving module 110, the extracting module 120, the aligning module 130, the analyzing module 140, the processing module 150, the visualization module 160 and the searching module 170 are shown as being deployed as functional components of the system 100, there is no limitation to such a deployment configuration according to the concepts of the invention. For example, one or more of the receiving module 110, the extracting module 120, the aligning module 130, the analyzing module 140, the processing module 150, the visualization module 160 and the searching module 170 may be deployed as respective functional blocks that is distinct from, but connected to, the system 100. One or more of the receiving module 110, the extracting module 120, the aligning module 130, the analyzing module 140, the processing module 150, the visualization module 160 and the searching module 170 can be separately implemented using logic circuits and/or executable code/machine readable instructions stored in a memory 180 of the system 100 for execution by a processor 190 to thereby perform functions as described herein. For example, the executable code/machine readable instructions may be stored in one or more memories 180, e.g. random access memory (RAM), read only memory (ROM), flash memory, magnetic memory, optical memory or the like, suitable for storing one or more instruction sets, e.g. application software, firmware, operating system, applets, and/or the like, data, e.g. configuration parameters, operating parameters and/or thresholds, collected data, processed data, and/or the like, etc. The one or more memories 180 may comprise processor-readable memories for use with respect to one or more processors 190 operable to execute code segments of any one or more of the functional modules as described above, and/or to utilize data provided thereby to perform functions of the system 100 as described herein. Additionally, or alternatively, one or more of the receiving module 110, the extracting module 120, the aligning module 130, the analyzing module 140, the processing module 150, the visualization module 160 and the searching module 170 may comprise one or more special purpose processors, e.g. application specific integrated circuit (ASIC), field programmable gate array (FPGA), graphics processing unit (GPU), and/or the like configured to perform functions of the system 100 as described herein.

Figure 2:
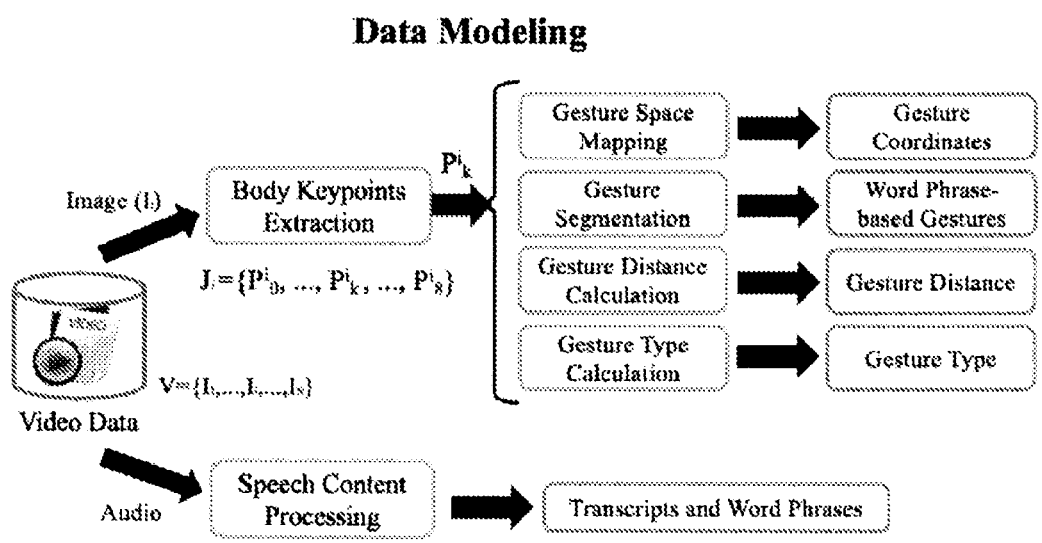
FIG. 2 depicts the data modeling architecture of the system of FIG. 1.

More specifically, in the computer implemented method of the present invention, a video data comprising a series of images or frames showing the subject person will be received via the receiving module 110. For example, given a presentation video, the video data can be modeled as a series of images or frames: $V=\{I_1, I_2, \ldots, I_i, \ldots, I_N\}$, where Ii indicates i-th image and N indicates the image number in the video. The received video data will be processed as shown in FIG. 2. Specifically, after the video data has been received, a transcript derived from an audio data associated with the video data will be extracted via the extracting module 120. For example, the transcript can be obtained by adopting any known automatic transcription techniques. The extracted transcript will be aligned, via the aligning module 130, with the series of images of the video data and particularly, with the alignment based on timestamps derived from the video data.

Figure 3:
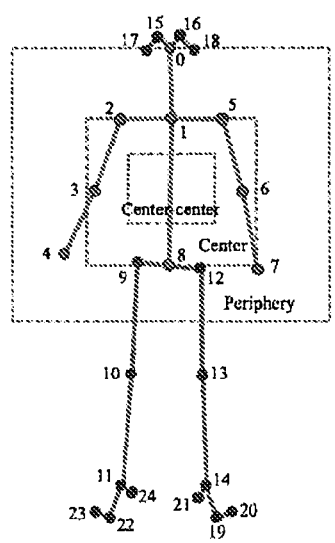
FIG. 3 shows an exemplified gesture space diagram showing 25 reference points on the body of the speaker.

Gestures of the subject speaker as shown in the video data will then be analyzed, via the analyzing module 140 based on the following steps. To obtain the detailed gestures of a speaker, a plurality of reference points from each of the series of images will first be identified. The plurality of reference points can be identified at positions representing one or more key body points of the subject, for example, at the joints of the subject. In one embodiment, an existing real-time multi-person key points detection system, OpenPose (Z. Cao, G. Hidalgo Martinez, T. Simon, S. Wei, and Y. A. Sheikh, "*Openpose: Realtime multi-person 2d pose estimation using part affinity fields,*" *IEEE Transactions on Pattern Analysis and Machine Intelligence,* 2019) [49], can be adopted for body and hand estimation. For each frame Ii, the corresponding body key points, $Ji=[P^i_0, P^i_1, \ldots, P^i_k, \ldots, P^i_{24}]$ can be detected, where $P^i_k=[x_k, y_k, c_k]$ indicates the coordinates, $x_k$ is x-axis value, $y_k$ is y-axis value and $c_k$ is a factor of confidence probability. In one embodiment, for the purpose of gesture detection where upper body and hand gestures are more concerned, nine body key points of the upper body are identified, such as body key points 0, 1, 2, 3, 4, 5, 6, 7 and 8, as shown in FIG. 3.

The step of identifying a plurality of reference points from each of the series of images showing the subject may further comprise mapping the plurality of reference points in respect of a predefined spatial region. Particularly, each of the plurality of reference points is assigned with an x-coordinate and an y-coordinate in respect of the predefined spatial region. In this regard, coordinate normalization is important because it is difficult to measure the gesture differences between different frames or presentation videos without a unified space. In one embodiment, the gesture coordinates are normalized based on Key point 0 (as shown in FIG. 3), or to be more specific, by using Key point 0 as the coordinate origin. The coordinates of other key points are calculated based on Key point 0. Further, the coordinates can be normalized to [~1~1] range by using the height of the subject person. In one further embodiment, the predefined spatial region is defined by the dashed rectangles as shown in FIG. 3 based on the McNeill's gesture space theory (D. McNeill, *Hand and mind: What gestures reveal about thought.* University of Chicago Press, 1992). The three-level dashed rectangles defining sub-regions of the predefined spatial region as center-center, center, and periphery regions from the inner to the outside in respect of the body of the subject speaker. Specifically, the center-center region is the area directly in front of the chest; the center region is the area surrounding the center-center region, which stretches from the shoulders down to the waist and covers both sides of the body; the periphery region stretches from ears to the knees, surrounding the center-center region.

Next, the series of images after mapping at the predefined spatial region will be segmented according to one or more selected texts comprising the transcript. As a speaker often uses various gestures for different speech content, the gestures of the speaker as shown in the series of images will be segmented according to the selected texts such as word phrases to determine relationships between gestures and speech content. To support word phrase analysis, known language analytics tools such as an natural language processing (NLP) library named Textacy, can be used to extract semantic phrases, such as but not limited to, noun phrases (NP), verb phrases (VP), prepositional phrases (PP), and subject-verb object phrases (SVP).

Following the aforementioned steps for body key points identification, the key points can be extracted frame-by-frame from the video data. The method may further comprise timestamping the identified plurality of reference points and/or the one or more selected texts comprising the transcript in accordance with the timestamps derived from the video data. As for speech transcripts, the transcripts with timestamps can be obtained by adopting automatic transcription techniques, such as but is not limited to, Amazon Transcribe, for example. Therefore, the key points and speech transcripts are naturally aligned based on timestamps.

The next step will be to identify a defined gesture type for each of the segmented images based on the identified plurality of reference points or key points. To facilitate the identification of defined gesture types from the segmented images, similar gestures are to be identified. In one embodiment, similar gestures can be identified by calculating a distance between gestures from two consecutive segmented images in respect of a selected reference point from the plurality of reference points. In this way, gesture distance between different continuous gestures can be estimated. For example, since gestures may contain different frame lengths, a distance function for measuring similarities between two consecutive, static frames is first defined. Then an algorithm such as dynamic time warping (DTW) (M. Muller, "*Dynamic time warping,*" Information Retrieval for Music and Motion, pp. 69-84, 2007) is adopted to measure distance between time-series data with variable lengths. Given two key point coordinates in frames F and G, and each key point vector is represented as $P^i_k=[x_k, y_k, c_k]$, where k indicates k-th key point in F and G, $x_k$ is x-axis value, $y_k$ is y-axis value and $c_k$ is the confidence probability, the distance between gesture in two frames can be defined as:

$$D(F, G) = \frac{1}{\sum_{k=0}^{8} F_{c_k}} * \sum_{k=0}^{8} F_{c_k} * \|F_{xy_k} - G_{xy_k}\|$$

where $F_{c_k}$ is the confidence probability for k-th key point, $F_{xy_k}$ and $G_{xy_k}$ is the coordinates of k-th key point of F and G, respectively.

We may then classify gestures of the segmented images into defined gesture types, for example, three different defined gesture types including, but not limited to, closed gestures, open gestures, and other gestures. For example, closed gestures may refer to gestures where hands are put closely or overlapped with the torso; open gestures may refer to gestures where two hands are far away from each other and wrist points go outermost, and other gestures may refer to those gestures where hands are fall in the torso region. More defined gesture types can be calculated based on different users' requirements.

The defined gesture types will then be processed, via a processing module 150, in correlation with the respective one or more selected texts comprising the transcript. The processing step may comprise processing the defined gesture type and the respective one or more selected texts comprising the transcript in respect of time, such as, according to the respective timestamps associated with the respective plurality of references points and the respective selected texts. The defined gesture type may also be processed with the respective one or more selected texts comprising the transcript in respect of the predefined spatial region, as discussed above. A distribution of the defined gesture types can then be determined in the predefined spatial region in accordance with the one or more selected texts comprising the transcript. For example, for one or more selected texts such as a selected phrase or sentence, the distribution of the defined gesture types in the predefined spatial region can be represented as or displayed in the form of a heatmap. In another embodiment, the distribution of the defined gesture types in the predefined spatial region can be represented or displayed by showing trajectories of one or more reference points.

In one further embodiment, the defined gesture types can be presented as figurative indicator such as human stick figure glyphs, although other forms of figurative signs, indicators or logos may also be adopted to visually represent the gestures of the subject speaker under the defined gesture types. Preferably, the figurative indicators are presented adjacent to, such as above the displayed corresponding one or more selected texts. In another embodiment, the figurative indicators and the corresponding one or more selected texts may also be displayed via one or more visual linkages.

In yet another embodiment, at least one of a horizontal movement and/or a vertical movement of one or more reference points of the segmented frame correlated with one or more selected texts can be presented in respect of time, for example, horizontal movement and/or a vertical movement of two reference points representing left hand and right hand of the subject speaker can be shown in respect of time.

Figure 4:
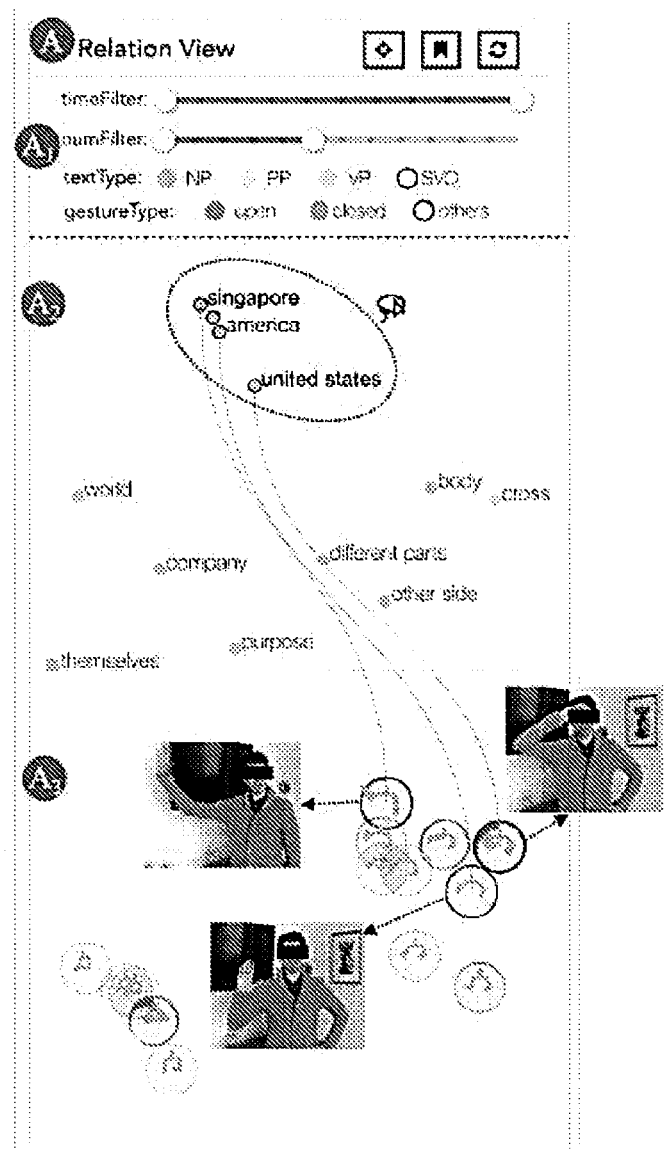
FIG. 4 shows a relation view of the user interface of the system of FIG. 1.
Figure 5:
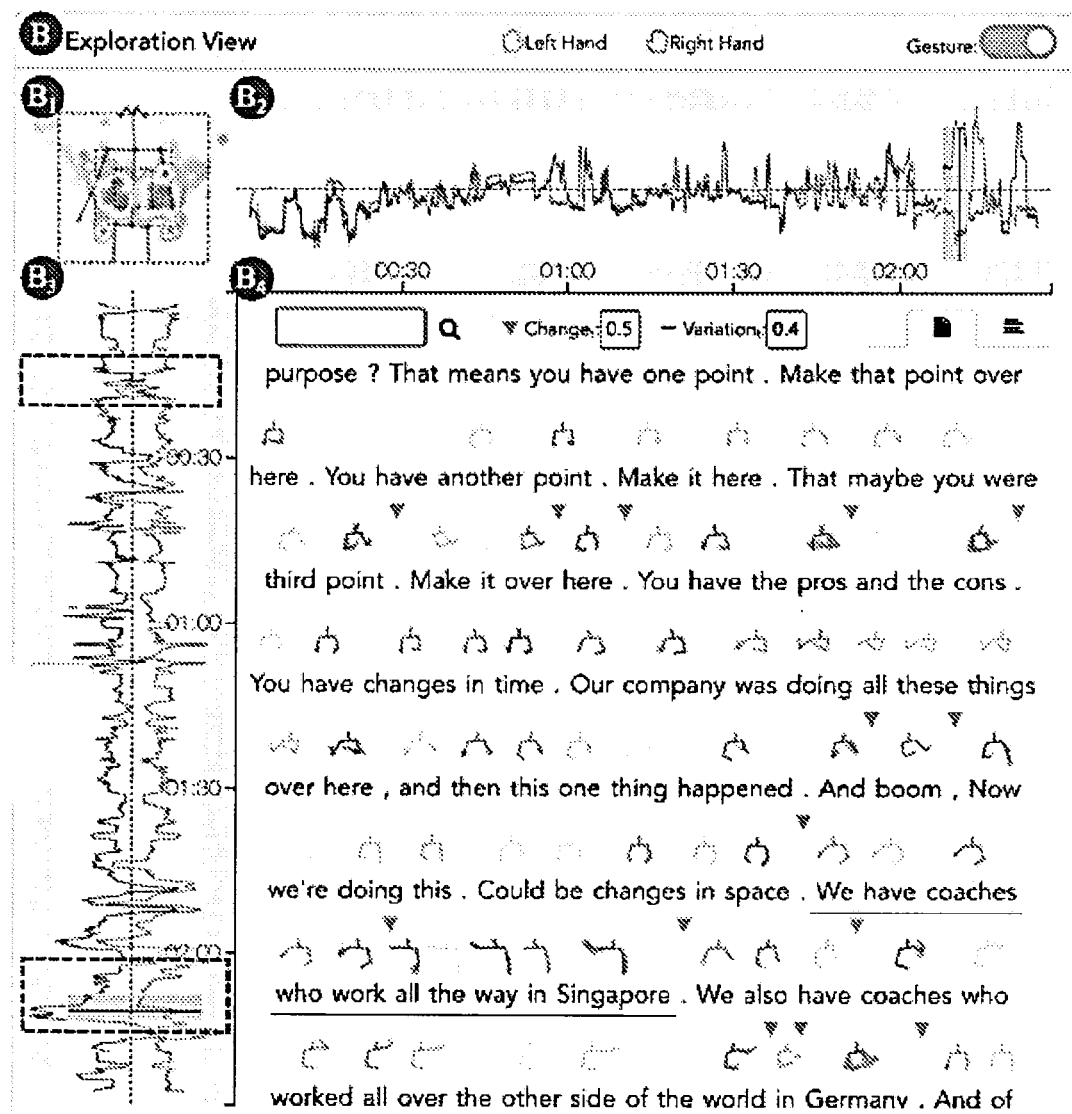
FIG. 5 shows an exploration view of the user interface of the system of FIG. 1.
Figure 6:
FIG. 6 shows a video view of the user interface of the system of FIG. 1.
Figure 7:
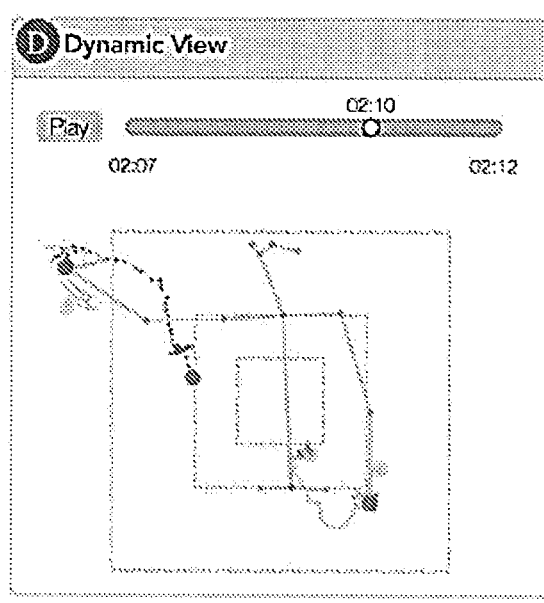
FIG. 7 shows a dynamic view of the user interface of the system of FIG. 1.

The processed analytic of gesture in a video can then be presented or display in an user interface via the visualization module 160, which is adapted to adapted to synchronously and interactively display one or more coordinated views, comprising at least (A) a relation view showing visual linkages of the defined gesture types with the respective one or more selected text, as shown in FIG. 4; (B) an exploration view showing a spatial distribution and/or a temporal distribution of the defined gesture types in association with the respective selected texts comprising the transcript, as shown in FIG. 5; (C) a video view showing the video being analyzed, as shown in FIG. 6; and/or (D) a dynamic view showing trajectories of one or more reference points in a selected image from the series of images, as shown in FIG. 7.

The visualization system comprising the four views are developed to assist video analytics, such as by professional presentation coaches or the speakers themselves to explore and analyze gesture usage of different presentations. A user-centered design process is followed to derive analytical tasks and design the system iteratively. As gesture usage is one of the most important presentation skills they are focusing on, the system of the present invention is designed to address the following analytical tasks with an aim to assist users' analysis on presentation videos particularly on analyzing gesture usages of the speakers:

T1 Obtain the spatial summary of gestures. A gesture summary will be helpful to coaches to quickly explore gestures and identify examples. It is useful to obtain a summary of the spatial distribution of the hand movements, so that users can know where speakers tend to put their hands and what kind of gestures a speaker may employ. Such a spatial summary can also indicate speakers' gesture styles.

T2 Show the temporal evolution of gestures. Since speakers can change gestures over time, it is necessary to explore the temporal evolution of gestures regarding the presentation content. A temporal summary of gestures makes users aware of how speakers move hands along time and gain deep insights into the temporal patterns of gesture usage. Besides, users can know how often to use certain gestures.

T3 Explore the correlation between gestures and speech content. It is helpful for users to explore the correlation between gestures and speech content, e.g., whether the speakers use gestures that are harmonious with speech content, and to know what gestures are used to deliver certain content, i.e. content-based exploration. Furthermore, it is useful to know what content different gestures tend to convey, i.e. gesture-based exploration.

T4 Find similar gestures used in presentations. Speakers may unconsciously use similar or repetitive gestures of their own styles. It is therefore helpful to explore similar or repetitive gestures, which can make speakers better aware of their own gestures. Further, users are allowed to compare different similar gestures with different speech content, whereby understanding why speakers use such gestures and providing suggestions for improvements. For example, users could detect repetitive non-meaningful gestures made by speakers.

T5 Enable interactive exploration of the presentation videos. Users may need to check the original presentation video and the corresponding transcripts to confirm their findings of a speaker's gesture usage. Thus, it is useful to provide an interactive exploration of the original presentation videos.

The four coordinated views of the system 100 of the present invention implement and visualize these analytical tasks. Specifically, the relation view (FIG. 4) shows the correlation between speech content and gestures (T3), as well as similar speech content and similar gestures (T4), which allows users to find what content gestures convey and what gestures are used to deliver the content. The exploration view (FIG. 5) presents a spatial summary of gesture usage (T1) with a heatmap in the gesture space (as shown by $B_1$ of FIG. 5). In addition, it visualizes the temporal evolution of gestures (T2) along with the horizontal and vertical directions by showing two perpendicular timelines (as shown by $B_2$ and $B_3$ in FIG. 5). Further, it annotates gesture glyphs on each word in the transcript, and highlights the dramatic changes in gestures (as shown by $B_4$ in FIG. 5), which allows users to explore both gestures and speech content (T3). The video view (FIG. 6) provides detailed information on the speech content and gestures (T5). The dynamic view (FIG. 7) shows hand movement trajectories of selected gestures with animation. Details of the four coordinated views will be described as follows:

Relation View

To explore what gestures are used in what speech content (T3), a linked graph can be adopted to show the correlation between speech content and gestures. As shown in FIG. 4, word phrases and gesture glyphs are located in a middle plane and a bottom plane, respectively, by using computer algorithm such as the t-SNE algorithm. In this way, word phrases with similar meaning or similar gesture glyphs are close to each other in the corresponding planes. To reveal the relationship between gesture and its context, word phrases in the middle plane and gesture glyphs at the bottom plane are linked with lines. When users select word phrases or gesture glyphs of their interests, the corresponding gesture glyphs or word phrases are highlighted and linked with lines. For word phrases, common word phrases, including noun phrases (NP), verb phrases (VP), prepositional phrases (PP), and subject-verb-object phrases (SVP) are extracted from the video transcript. These phrases are then converted into pre-trained global vectors embeddings for projection. As for gesture glyphs, a glyph is designed for each gesture phase such as a predefined gesture type to better reveal patterns. As shown in $A_3$ of FIG. 4, human stick figures are integrated into the centers of circles classified into, for example, three-type gestures, i.e., open gestures, closed gestures, and other gestures. Preferably, filtering configurations and/or legends may further be shown at the top plane (as shown by $A_1$ in FIG. 4). Users are allowed to filter text phrases with a certain time range or occurrence number. Further, by clicking a legend type, the corresponding part can be shown or hidden. Some other interactions can be provided to facilitate users' exploration. For example, when users click a word phrase or gesture glyph of interest, users can refer to the context of the word in the video, as well as the transcript area of the exploration view (FIG. 5). Further, bookmark interactions are provided to allow users to save the gestures of their interest, enabling future explorations. The relation view is linked to the other views for an interactive and synchronized presentation of information.

Exploration View

To support intuitive and effective gesture-based and content-based explorations, the exploration view (FIG. 5), which shows both spatial and temporal patterns of gestures, as well as corresponding content is developed. Specifically, the exploration view contains three major components, i.e., a heatmap in the gesture space to reveal the spatial summary of gestures (T1), two mutually perpendicular timelines to uncover the temporal distribution of gestures (T2), and a transcript area to show the corresponding speech content and gestures (T3).

Heatmap reveals spatial patterns: As shown in $B_1$ of FIG. 5, to reveal spatial patterns of gestures used in presentation videos, a heatmap is used for describing spatial patterns over a predefined spatial region, i.e. the gesture space. Three dashed rectangles are used to divide the gesture space into three areas, i.e., the center-center region, center region, and periphery region. A human stick-figure skeleton defined by the plurality of reference points is also shown in the gesture space, which can provide some context for the gesture space and heatmap. The heatmap in the gesture space can clearly reveal where a speaker tends to put his/her hands during a presentation. The heatmap allows an easy-to-understand presentation to the users in terms of spatial patterns.

Timelines describe temporal hand movements: As shown in $B_2$ and $B_3$ of FIG. 5, two mutually perpendicular timelines are used to describe hand movements. These two timelines are aligned with the gesture space in the heatmap part (as shown by $B_1$ of FIG. 5). The horizontal timeline (as shown by $B_2$ of FIG. 5) describes the vertical position of two hands, with one line indicating the right hand, and the other line indicating the left hand. The two lines can be represented in different colors to distinguish the right and left movement. The horizontal dashed line is aligned with the vertical center of the gesture space shown in $B_1$, allowing an easy observation on the vertical position of two hands. At the bottom of this timeline, there is a click area for users to seek to the corresponding parts of the presentation videos. A vertical black line indicates the current time frame. Similarly, the vertical timeline as shown in $B_3$ is used to describe the horizontal position of two hands. The same visual encoding is applied in this timeline. From the vertical timeline, users can observe how the speaker moves his/her hands horizontally. For example, whether the speaker uses open hand gestures or closed hand gestures can be observed from this timeline. Besides, two timelines are linked together, i.e., when brushing one timeline, the corresponding place in the other timeline will be highlighted.

Transcript area shows speech content. As shown in $B_4$, the speech content is explicitly shown. To better reveal gestures used for speech content, human stick figures are provided adjacent to, such as overlaying on top of the corresponding words. To be specific, gestures of the frames within a word are drawn on top of the word, which shows aggregate information of gestures for that word. Spatial variation is further defined to describe the variation of gestures within a word, and temporal change to describe the change of gestures between two words. For example, the average gesture skeleton defined by a plurality of reference points of each word is first calculated, then the gesture skeleton variation is calculated within a word as spatial variation, while the gesture skeleton change between two words as temporal change can be determined. Both spatial variation and temporal change value are normalized to [0~1] with the threshold being customizable by the users. For example, as shown in $B_4$ of FIG. 5, the change threshold and variation threshold are set to 0.5 and 0.4, respectively. In one embodiment, high spatial variations and/or large temporal changes can be highlighted by different colors or signs at the transcript area such as, with the high spatial variations being encoded with strokes and the large temporal changes being encoded with triangles, for example. When users select interesting words, the corresponding time range will be highlighted in two timelines with a gray area. In reverse, when users select an interesting area in timelines, corresponding words will be highlighted. Besides, users are allowed to search keywords by inputting a word at the top of the transcript area, and corresponding words will be highlighted with underlines with the corresponding gestures also displayed. To facilitate comparison with different gestures in the same word, a multiple-line mode showing corresponding sentences is provided. The exploration view is linked to the other views for an interactive and synchronized presentation of information.

Video View

For video analysis, referring to the original video may help providing a better explanation. Therefore, the original video is embedded for exploration in the video view (FIG. 6). After selecting a video of interest, the video is presented in this view. Screenshot interaction is further provided to record one or more selected moments of interest. The corresponding information, in term of time and word, is placed under screenshots, which can facilitate gesture usage exploration. Again, the video view is linked to the other views for an interactive and synchronized presentation of information. Users can refer to the video for detailed analysis (T5).

Dynamic View

The dynamic view (FIG. 7) is designed to visualize gesture trajectories through animations, where users can play the animation and observe trajectories of the selected gesture. The predefined spatial region or the gesture space is indicated with three dashed rectangles. A human stick-figure is presented to provide context for the gesture space. A gesture trajectory is encoded with a line and dots in the gesture space. Lines of different colors can be used to indicate the trajectory of the right hand and the trajectory of the left hand. When users brush in the timelines of the exploration view to specify a time range, the corresponding gesture trajectories will be simultaneously updated in the dynamic view. Users are allowed to play/pause the animation by pressing the button. The dynamic view is linked to the other views for an interactive and synchronized presentation of information The four views in the system 100 are linked and equipped with various user interactions, which provides strong visual analytic abilities. For example, in the video view, users are allowed to seek different time frames by clicking the video timeline. Also, after clicking the timelines in the exploration view, the video then jumps to the corresponding time point. When users click on words in the exploration view, word phrases and gesture glyphs in the relation view, the video will be played from the corresponding time frame. Such clicking interactions allow users to refer to the raw video for further exploration. When users brush the horizontal and vertical timelines in the exploration view, the corresponding content will be highlighted in the transcript area. When users brush the transcript area to select words of interest, the corresponding time range will be highlighted in the timelines. The brushing interaction is mainly used to select a focus area for exploration. The system 100 further enables users to search gestures by keywords. When users input a keyword into the search area in the exploration view, the corresponding words will be found and highlighted with red underlines. Moreover, users are allowed to configure our system. For example, they can specify whether the gestures over words in the exploration view should be shown or not. Users can adjust the thresholds of the spatial variation and temporal change in the exploration view. Also, users are allowed to configure the filtering range in the relation view.

Case Studies

Two usage scenarios are described to demonstrate usefulness of the present invention using a gesture practice video and two TED talk videos.

Analyzing Open or Closed Gestures in a Practice Video

In this scenario, a professional presentation coach, Lidia, analyzes collected practice videos. Her goal is to obtain evidence about the speaker' performance on mastering the skills of gestures. Also, the analysis results can provide some examples for her teaching later. Therefore, she explores the collected practice videos with the present invention. Lidia first selects a video in the video view. The video lasts about three minutes and records how a speaker practices gestures. Then other views are updated correspondingly. To observe the spatial overview of the speaker's gestures (T1), Lidia shifts attention to the heatmap in the gesture space (as shown by $B_1$ of FIG. 5). The large area of heatmap indicates that the speaker moves his hands intensely around the two sides within the center area of the gesture space. Also, the location of the less dense part of the heatmap indicates that the speaker sometimes stretches his hands outside the center area. It is normal for speakers to put their hands in front of their bodies most of the time. According to Lidia's domain knowledge, she thinks that the speaker may tend to use closed and open gestures. Closed gestures refer to those gestures crossing arms or keeping hands close to the body, while open gestures refer to those gestures opening arms or moving hands far away from the body. These two types of gestures are widely used in presentations. Lidia feels interested in whether the speaker uses appropriate closed and open gestures. Therefore, Lidia need to find out when the speaker uses closed gestures and open gestures. She further observes the two mutually perpendicular timelines (as shown by $B_2$ and $B_3$ of FIG. 5), where she can obtain a temporal summary of gestures (T2). Two lines, preferably in different colors, indicate the movements of the right hand and left hand, respectively. From the horizontal timeline, the speaker first puts his hands below the dashed centerline, then moves his hands up to be around the dashed centerline. At the end, the speaker makes large vertical movements in the vertical direction. From the vertical timeline, the speaker sometimes moves both hands together, both hands to one side, and moves both hands away. This information confirms that the speaker uses some closed and open gestures in some moments.

Then, she decides to explore details by examining interesting moments about closed and open gestures (T2). For example, Lidia examines a moment when the two lines representing left and right hands are close, as shown in the upper thick dashed line rectangle as shown by $B_3$ of FIG. 5. Lidia finds that the corresponding speech content is "Locked in, they cross their body". After watching the raw video (T5), Lidia realizes that the speaker moves both hands close to each other to express what he is saying. Lidia believes that it is a good example of using closed gestures. Further, Lidia examines a moment of the large movements, where the two lines are spaced apart, as shown in the lower thick dashed line rectangle in $B_3$ of FIG. 5. The corresponding speech content is " . . . who work all the way in Singapore . . . , who work all over the other sides of the world in Germany". Lidia further checks the gestures used for this content in the video view and dynamic view. As shown in FIGS. 6 and 7, she finds that the speaker opens his hands to express different locations and long distances, which is a good example of using open gestures.

Figure 8A:
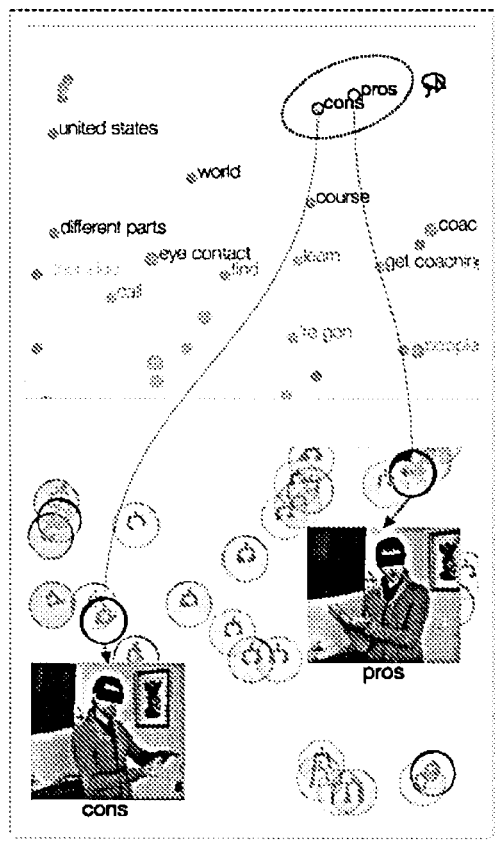
FIGS. 8A and 8B show exemplified usage scenarios based on the system of the present invention.
Figure 8B:
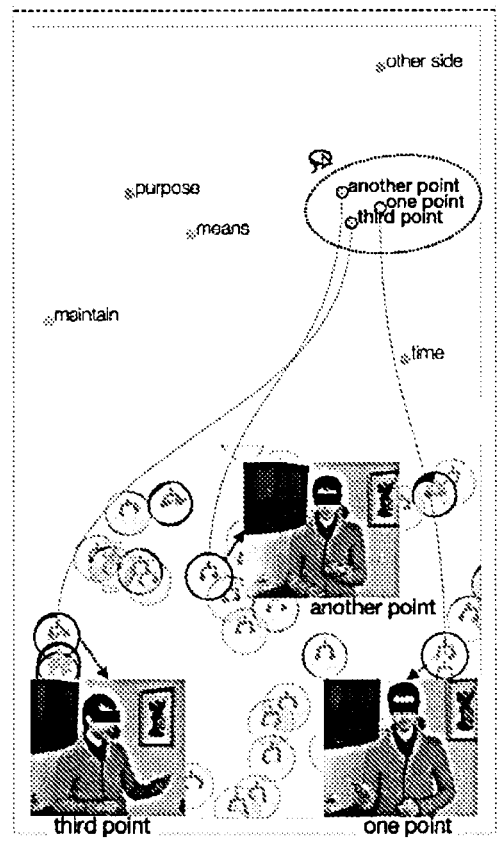

To further explore the correlation between gesture and speech content (T3), Lidia shifts her attention to the relation view. As shown by $A_2$ of FIG. 4, to find out gestures used to express location, she selects several locations, e.g., America, Germany and Singapore in the noun phrases. Corresponding gestures are highlighted at the bottom plane linked with the selected word phrases. By examining each gesture glyph, Lidia finds the speakers tend to use open gestures to express locations that are far away from each other, such as moving his hands to the right side or left side. As shown in FIG. 8A, to find out gestures that are used to express opposite viewpoints, Lidia selects two words, "pros" and "cons". By examining corresponding gesture glyphs, she notices that the speaker tends to use two opposite directions (the right-hand and left-hand sides) to express opposite viewpoints. Similarly, as shown in FIG. 8B, Lidia finds the speaker tends to move his hands to different directions (the right-hand side, middle, and left-hand side) to enumerate different viewpoints. Lidia thinks that it is quite common for speakers to use deictic gestures to draw attention to different objects and representational gestures, e.g., metaphoric gestures to refer to objects or events. Also, Lidia wants to explore speech content used for similar gestures (T4). Lidia selects several similar gestures, the corresponding word phrases are highlighted and linked, as shown in FIGS. 9A and 9B. After checking the details, as shown in FIG. 9A, she finds that the speaker moving his hands from the bottom to top to express the meanings of "low signal" to "high signal". Similarly, the speaker emphasizes the meaning of "eye contact" by moving his hands from the bottom to top for pointing his eyes. What is more, as shown in FIG. 9B, the speaker moves his hands to the left-hand side to enumerate different locations (e.g., "Germany") or viewpoints (e.g., "third point"). Meanwhile, Lidia is curious about the word "happens" since this word is not related to enumeration at first glance, then she checks the details and finds that "happens" corresponds to the context "what happens next", which is also used to introduce a subsequent viewpoint. In summary, after analyzing the video with the present invention, Lidia confidently concludes that the speaker masters gesture usage quite well. The speaker can use appropriate gestures for different speech content, especially the closed gestures and open gestures. Also, she thinks that this video demonstrates a good usage of metaphoric gestures, i.e., using hand movements to represent abstract ideas or concepts, which is a good example for her teaching.

Exploring Beat Gestures of TED Talk Videos

In this scenario, we describe another professional presentation coach, Kevin, who usually uses TED talk videos as examples in his presentation training classes. During his teaching, he needs to analyze TED videos and show some examples to his students. In this scenario, he explores and compares two TED talk videos, one is named "American bipartisan politics can be saved—here's how", which is about eleven minutes long; and the other video named "Why global jihad is losing" lasts seventeen minutes long.

Figure 10B:
FIGS. 10A, 10B, 10C and 10D show further exemplified usage scenarios based on the system of the present invention.
Figure 10D:
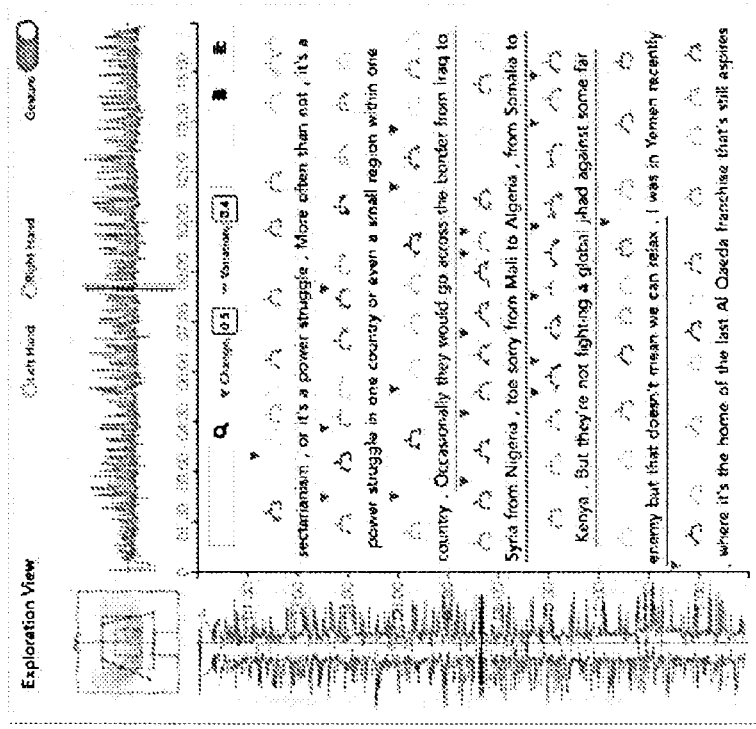
Figure 10A:
Figure 10C:
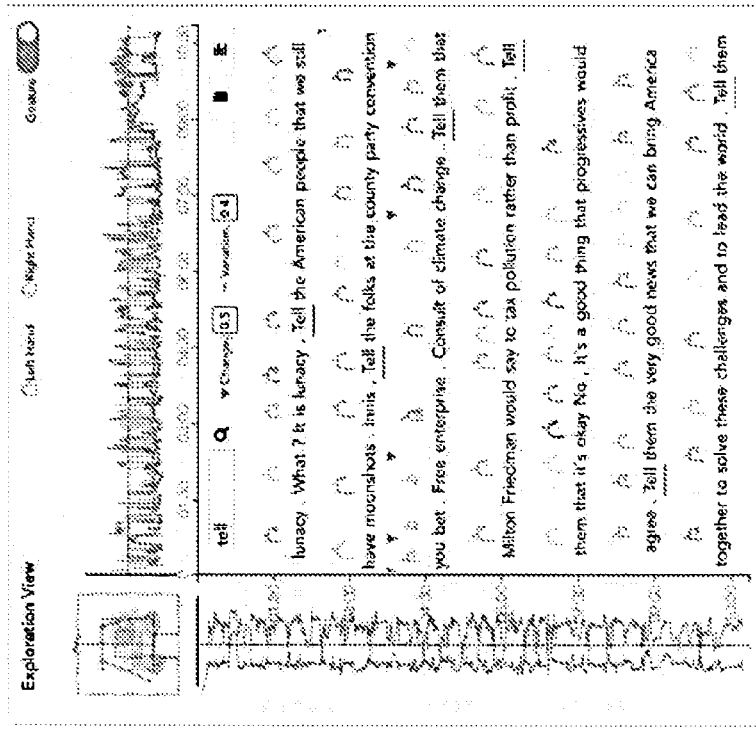

After Kevin selects the first video, the corresponding views are updated. He can observe the spatial and temporal distribution of the gestures (T1, T2) from the exploration view (FIG. 10C). The heatmap in the gesture space indicates the speaker mainly puts his hands in the low position. Sometimes, he raises his left hand up. This pattern can further be examined by the horizontal timeline, where the line representing his right hand mainly stays in the low position and the line representing his left hand fluctuates all the time. As for the vertical timeline, his right hand stays almost in the same horizontal place, while his left hand shows some movements, e.g. moving to the center and moving back to the left side. After referring to the original video, Kevin notices that the speaker's right hand is carrying something so that it does not move too much at all. While the speaker sometimes raises his left hand when he wants to emphasize some words. In addition, the speaker tends to use parallel sentence structures. For example, as shown in the transcript area of FIG. 10C, the speaker uses "tell" many times, which are underlines. The speaker repetitively raises his left hand and quickly puts it down to emphasize the word "tell". The corresponding gesture is shown in FIG. 10A.

To explore another style of gestures, Kevin selects the second video. As shown in FIG. 10D, the spatial and temporal patterns are quite different from the first video (T1, T2). The heatmap in the gesture space indicates that the speaker tends to use his hands symmetrically and puts his hands in front of his stomach most of the time. Also, the speaker sometimes moves his hands to the left or right side. This pattern is further examined in the two mutually perpendicular timelines. His hands mainly move around the above dashed centerline in the horizontal timeline, which is indicated by the two fluctuating lines, as shown in FIG. 10D. Also, his right hand and left hand move around the left side and right side respectively in the vertical timeline. After referring to the raw video (T5), Kevin finds the corresponding gesture (FIG. 10B). Compared with the speaker in the first video, the hand movements of this speaker are more intense. As shown in the transcript area of FIG. 10D, there are more triangles and strokes, which further indicates that the speaker is excited and tends to move his hands more intensely.

Overall, Kevin finds that speakers in both videos mainly used beat gestures, i.e., the rhythmic gestures following alongside the natural stress patterns of speech. Although most of the time, the gestures used in these two videos do not have a clear meaning, these gestures demonstrate the rhythm of the speakers. According to his domain knowledge, Kevin confirms that these two videos are good examples for demonstrating beat gestures with different styles, i.e., moving hands up and down to emphasize some words in parallel sentence structures and moving hands to left and right sides symmetrically to emphasize another set of words. Basically, the beat gestures have been employed by the speakers to enhance the message delivery in their presentations.

Although the above embodiments describe applications of the present invention in analyzing the gestures of a speaker in presentation videos, the present invention should not be limited to these specific applications. Instead, it is appreciated that the present invention can be used to analyze other related human behaviors in other scenarios or applications, such as for analyzing gesture usage in sign language, analyzing gesture usage of a music conductor, and analyzing body postures of dancers. For the detailed visualization designs as implemented in the present invention, the two mutually perpendicular timelines can be applied to analyze the spatial distribution and temporal evolution of gestures used in sign language. The human stick-figure glyphs can be applied to reveal and compare different postures of dancers following kinds of music.

The present invention relates to a system for analysis a video and particularly, but not exclusively, the present invention provides an interactive visual analytic method and system to facilitate gesture exploration in presentation videos. The system facilitates gesture-based and content-based exploration of gesture usage in presentation videos, as well as presenting correlation between the gestures and content of the videos. The system further provides both spatial and temporal overview of gestures, as well as a detailed analysis of gestures. Four coordinated views have been designed and implemented to support the gesture-based and content-based exploration scheme. Specifically, the exploration view enables users to obtain a quick overview of the spatial and temporal distributions of gestures. The dynamic hand movements are firstly aggregated through a heatmap in the gesture space for uncovering spatial patterns, and then decomposed into two mutually perpendicular timelines for revealing temporal patterns. The relation view allows users to explicitly explore the correlation between speech content and gestures by enabling linked analysis and intuitive glyph designs. The video view and dynamic view show the context and overall dynamic movement of the selected gestures, respectively. The present invention therefore provides a useful and effective analysis of presentation videos and exploration of gestures in correlation with the speech content.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A computer implemented method for analysing a video, comprising the steps of:
   receiving, via a receiving module, a video data comprising a series of images showing a subject;
   extracting, via an extracting module, a transcript derived from an audio data associated with the video data;
   aligning, via an aligning module, the series of images of the video data with the transcript derived from the audio data associated with the video data based on timestamps derived from the video data;
   analysing, via an analysing module, gestures of the subject from the series of images, comprising the steps of:
      identifying a plurality of reference points from each of the series of images showing the subject;
      segmenting the series of images in accordance with one or more selected texts comprising the transcript;
      identifying a defined gesture type for each of the segmented images based on the identified plurality of reference points;
   processing, via a processing module, the defined gesture types in correlation with respective one or more selected texts comprising the transcript; and
   presenting, via a visualization module, a correlation between the defined gesture type with the respective one or more selected texts comprising the transcript;
   wherein the visualization module is adapted to display one or more of the following views, comprising:
      a relation view showing visual linkages of the defined gesture types with the respective one or more selected text;
      an exploration view showing a spatial distribution and/or a temporal distribution of the defined gesture types in association with the respective selected texts comprising the transcript;
      a dynamic view showing trajectories of one or more reference points in a selected image from the series of images; and
      a video view showing the video being analysed.

2. The computer implemented method according to claim 1, further comprising timestamping one or more of the identified plurality of reference points and the one or more selected texts comprising the transcript in accordance with the timestamps derived from the video data.

3. The computer implemented method according to claim 1, wherein the processing step comprises processing the defined gesture type and the respective one or more selected texts comprising the transcript in respect of time.

4. The computer implemented method according to claim 1, wherein the step of identifying a plurality of reference points from each of the series of images showing the subject further comprises mapping the plurality of reference points in respect of a predefined spatial region.

5. The computer implemented method according to claim 4, wherein the processing step comprises processing the defined gesture type with the respective one or more selected texts comprising the transcript in respect of the predefined spatial region.

6. The computer implemented method according to claim 4, further comprising determining a distribution of the defined gesture types in the predefined spatial region in accordance with the one or more selected texts comprising the transcript.

7. The computer implemented method according to claim 6, further comprising displaying the distribution of the defined gesture types in the predefined spatial region in the form of one or more of a heatmap and by showing trajectories of one or more reference points of the plurality of reference points.

8. The computer implemented method according to claim 1, wherein the step of identifying a defined gesture type for each of the segmented images based on the identified plurality of reference points comprises calculating a distance between gestures from two consecutive segmented images in respect of a selected reference point from the plurality of reference points.

9. The computer implemented method according to claim 8, wherein the step of calculating a distance between two consecutive segmented images in respect of a selected reference point comprises computation based on the equation:

$$D(F, G) = \frac{1}{\sum_{k=0}^{8} F_{c_k}} * \sum_{k=0}^{8} F_{c_k} * \|F_{xy_k} - G_{xy_k}\|$$

wherein $F_{c_k}$ is a factor of confidence probability for k-th reference point of the plurality of reference points; and $F_{xy_k}$ and $G_{xy_k}$ are x and y coordinates of k-th reference point of two consecutive images F and G, respectively.

10. The computer implemented method according to claim 1, further comprising presenting, via a visualization module, a correlation between the defined gesture types and the one or more selected texts comprising the transcript.

11. The computer implemented method according to claim 1, wherein the defined gesture types comprise at least a closed gesture, an open gesture and other gestures.

12. The computer implemented method according to claim 1, wherein the defined gesture types are presented as figurative indicators arranged adjacent to and/or via one or more visual linkages with the corresponding one or more selected texts.

13. The computer implemented method according to claim 1, wherein the one or more selected texts comprise semantic phrases of the transcript comprising one or more of noun phrases, verb phrases, prepositional phrases and subject-verb object phrases.

14. The computer implemented method according to claim 1, further comprising presenting at least one of a horizontal movement and a vertical movement of one or more reference points in respect of time, wherein the one or more reference points comprises two reference points representing left hand and right hand of the subject.

15. The computer implemented method according to claim 1, further comprising searching, via a searching module, by inputting either a defined gesture type or a selected text; and outputting a corresponding one of a selected text or a defined gesture type, respectively.

16. A system for analysing a video, comprising:
a receiving module for receiving a video data comprising a series of images showing a subject;
an extracting module for extracting a transcript derived from an audio data associated with the video data;
an aligning module for aligning the series of images of the video data with the transcript derived from the audio data associated with the video data based on timestamps derived from the video data;
an analysing module for analysing gestures of the subject from the series of images, comprising the steps of:
identifying a plurality of reference points from each of the series of images showing the subject;
segmenting the series of images in accordance with one or more selected texts comprising the transcript;
identifying a defined gesture type for each of the segmented images based on the identified plurality of reference points;
a processing module for processing the defined gesture types in correlation with respective one or more selected texts comprising the transcript; and
a visualization module for presenting a correlation between the defined gesture type with the respective one or more selected texts comprising the transcript; wherein the visualization module is adapted to display one or more of the following views, comprising:
a relation view showing visual linkages of the defined gesture types with the respective one or more selected text;
an exploration view showing a spatial distribution and/or a temporal distribution of the defined gesture types in association with the respective selected texts comprising the transcript;
a dynamic view showing trajectories of one or more reference points in a selected image from the series of images; and
a video view showing the video being analysed.

17. The system according to claim 16, further comprising a searching module for searching, by inputting either a defined gesture type or a selected text; and outputting a corresponding one of a selected text or a defined gesture type, respectively.

18. A non-transitory computer readable medium storing machine-readable instructions executable by a processor to configure a system for analysing a video by implementing the steps of:
receiving, via a receiving module, a video data comprising a series of images showing a subject;
extracting, via an extracting module, a transcript derived from an audio data associated with the video data;
aligning, via an aligning module, the series of images of the video data with the transcript derived from the audio data associated with the video data based on timestamps derived from the video data;
analysing, via an analysing module, gestures of the subject from the series of images, comprising the steps of:
identifying a plurality of reference points from each of the series of images showing the subject;
segmenting the series of images in accordance with one or more selected texts comprising the transcript;
identifying a defined gesture type for each of the segmented images based on the identified plurality of reference points;

processing, via a processing module, the defined gesture types in correlation with respective one or more selected texts comprising the transcript; and presenting, via a visualization module, a correlation between the defined gesture type with the respective one or more selected texts comprising the transcript;

wherein the visualization module is adapted to display one or more of the following views, comprising:

a relation view showing visual linkages of the defined gesture types with the respective one or more selected text;

an exploration view showing a spatial distribution and/or a temporal distribution of the defined gesture types in association with the respective selected texts comprising the transcript;

a dynamic view showing trajectories of one or more reference points in a selected image from the series of images; and a video view showing the video being analysed.

* * * * *